United States Patent
Madsen et al.

(10) Patent No.: US 12,467,585 B2
(45) Date of Patent: Nov. 11, 2025

(54) PORTABLE CLASS-II LUBRICATION DEVICE

(71) Applicant: HOVE A/S, Glostrup (DK)

(72) Inventors: Ivan Madsen, Odense SV (DK); William Lisby, Svendborg (DK); Thomas Hesselbjerg Lisby, Svendborg (DK)

(73) Assignee: HOVE A/S, Glostrup (DK)

( * ) Notice: Subject to any disclaimer, the term of this patent is extended or adjusted under 35 U.S.C. 154(b) by 0 days.

(21) Appl. No.: 18/690,380

(22) PCT Filed: Sep. 9, 2022

(86) PCT No.: PCT/EP2022/075057
§ 371 (c)(1),
(2) Date: Mar. 8, 2024

(87) PCT Pub. No.: WO2023/036908
PCT Pub. Date: Mar. 16, 2023

(65) Prior Publication Data
US 2025/0129884 A1    Apr. 24, 2025

(30) Foreign Application Priority Data
Sep. 10, 2021  (EP) ..................................... 21195985

(51) Int. Cl.
*F16N 7/38* (2006.01)
*F04B 17/03* (2006.01)
(Continued)

(52) U.S. Cl.
CPC ................ *F16N 7/38* (2013.01); *F04B 17/03* (2013.01); *F04C 11/00* (2013.01); *H02K 11/30* (2016.01);
(Continued)

(58) Field of Classification Search
CPC . F16N 7/38; F16N 13/06; F16N 13/20; F16N 2013/063; F16N 2270/72;
(Continued)

(56) References Cited

U.S. PATENT DOCUMENTS 2,587,246 A * 2/1952 Touborg .................. F25B 31/02
74/25
3,394,873 A * 7/1968 Reese ..................... F04B 49/10
123/198 R
(Continued)

FOREIGN PATENT DOCUMENTS

WO  2013034154 A1  3/2013
WO  2021105362 A1  6/2021
WO  2021116100 A1  6/2021

*Primary Examiner* — Henry Y Liu
(74) *Attorney, Agent, or Firm* — Dinsmore & Shohl LLP

(57) ABSTRACT

The present disclosure relates to a portable Extra-Low Voltage (ELV) class-II lubrication device comprising: at least one class-II power supply; at least one electric motor controller powered by the at least one power supply; at least one electric motor controlled by the at least one motor controller; at least one pump activated by the at least one electric motor and connected to at least one lubricant container, the pump configured to pump a lubricant from the at least one container to at least one target to be lubricated, wherein an output voltage of the at least one power supply and an output voltage of the at least one motor controller and an operating voltage of the at least one motor is equal to or less than 50 Volts AC or 120 Volts DC.

20 Claims, 7 Drawing Sheets

(51) Int. Cl.
  *F04C 11/00* (2006.01)
  *F16N 13/06* (2006.01)
  *F16N 13/20* (2006.01)
  *H02K 11/30* (2016.01)
  *H02K 11/40* (2016.01)

(52) U.S. Cl.
  CPC .......... *H02K 11/40* (2016.01); *F04C 2210/14* (2013.01); *F04C 2240/40* (2013.01); *F16N 13/06* (2013.01); *F16N 2013/063* (2013.01); *F16N 13/20* (2013.01); *F16N 2270/72* (2013.01)

(58) Field of Classification Search
  CPC ...... F04B 17/03; F04C 11/00; F04C 2210/14; F04C 2240/40; H02K 11/30; H02K 11/40
  USPC .......................................................... 184/32
  See application file for complete search history.

(56) References Cited

U.S. PATENT DOCUMENTS

| | | | | |
|---|---|---|---|---|
| 4,831,313 A * | 5/1989 | Beilfuss | ............... | F25B 49/025 388/933 |
| 5,006,773 A * | 4/1991 | Goldberg | ............ | H02P 8/12 318/696 |
| 6,122,966 A * | 9/2000 | Goodman | ........... | F16C 33/6625 73/660 |
| 6,244,387 B1 * | 6/2001 | Paluncic | ............... | F16N 25/02 184/32 |
| 6,452,794 B1 * | 9/2002 | Rumney | ............... | G06F 1/188 361/753 |
| 6,911,800 B2 * | 6/2005 | Kobayashi | ............ | G05B 19/40 318/560 |
| 7,042,180 B2 * | 5/2006 | Terry | ........................ | H02P 6/34 318/473 |
| 7,884,561 B2 * | 2/2011 | Peng | ........................ | H02P 6/08 318/400.06 |
| 8,363,371 B2 * | 1/2013 | Korrek | ................. | H01H 51/005 361/93.1 |
| 8,528,782 B2 * | 9/2013 | Mergener | ................ | F16N 11/04 222/37 |
| 8,675,330 B2 * | 3/2014 | Korrek | ................. | H03M 1/207 361/100 |
| 9,239,572 B2 * | 1/2016 | Korrek | ..................... | G05B 9/02 |
| 9,479,093 B2 * | 10/2016 | Silitonga | ................. | H02P 23/22 |
| 10,855,072 B2 * | 12/2020 | Chen | ..................... | H03K 17/60 |
| 11,056,995 B2 * | 7/2021 | Yoshino | ................. | H02P 23/30 |
| 11,496,082 B2 * | 11/2022 | Yoshino | ................. | H02P 23/26 |
| 2004/0113581 A1 * | 6/2004 | Kobayashi | ............ | G05B 19/40 318/685 |
| 2005/0029976 A1 * | 2/2005 | Terry | ....................... | H02P 6/12 318/400.34 |
| 2007/0247094 A1 * | 10/2007 | Peng | ........................ | H02P 6/08 318/268 |
| 2008/0225457 A1 * | 9/2008 | Korrek | ................. | H03M 1/207 361/100 |
| 2009/0087319 A1 * | 4/2009 | Russold | ................ | F04B 49/065 417/44.2 |
| 2009/0133962 A1 | 5/2009 | Orlitzky et al. | | |
| 2011/0291604 A1 * | 12/2011 | Cheng | ....................... | H02P 8/12 318/696 |
| 2012/0286862 A1 * | 11/2012 | Korrek | ................. | H01H 51/005 330/147 |
| 2012/0299578 A1 * | 11/2012 | Korrek | ................. | H01H 47/002 324/76.15 |
| 2013/0049462 A1 * | 2/2013 | Chen | ................... | H05B 45/395 307/18 |
| 2013/0119081 A1 * | 5/2013 | Mergener | ................ | H01H 9/06 222/37 |
| 2013/0161130 A1 * | 6/2013 | Alexander | ............... | F16N 13/14 184/32 |
| 2014/0008383 A1 * | 1/2014 | Mergener | ................ | H01H 3/20 222/37 |
| 2015/0054435 A1 * | 2/2015 | Silitonga | ................. | H02P 29/10 318/400.04 |
| 2017/0173613 A1 | 6/2017 | Hove et al. | | |
| 2020/0259439 A1 * | 8/2020 | Yoshino | ................. | H02P 23/26 |
| 2020/0321774 A1 * | 10/2020 | Chen | .................... | H03K 19/20 |
| 2021/0336573 A1 * | 10/2021 | Yoshino | ................. | H02P 23/30 |

* cited by examiner

PORTABLE CLASS-II LUBRICATION DEVICE

CROSS-REFERENCE TO RELATED APPLICATIONS

This application is the U.S. National Stage of PCT/EP2022/075057 filed on Sep. 9, 2022, which claims priority to European Patent Application 21195985.3 filed on Sep. 10, 2021, the entire content of both are incorporated herein by reference in their entirety.

FIELD OF THE INVENTION

The invention relates to a portable class-II lubrication device.

BACKGROUND OF THE INVENTION

Mechanical systems may have bushings, rotatable parts or movable parts that are often required to be lubricated in order to minimize wear-out and consumption of mechanical parts. Failure to lubricate mechanical parts during maintenance of the system may often lead to early consumption, wear-out and/or rupture of mechanical parts and consequent failure of the system.

Grease pumps are known since many years ago and are utilized to pump grease or oil to targets to be lubricated, the target being, for example, a mechanical part of a system. Grease pumps are used to transfer a lubricant, may that be oil or grease or other type of lubricant, such as a synthetic lubricant, to a target to be lubricated.

Lubrication pumps are also widely used nowadays for lubricating mechanical parts in, for example, wind-turbines. Wind-turbines have rotatable mechanical parts and other mechanical parts that require lubrication. Lubrication of mechanical parts for wind-turbines typically requires an user to perform the lubrication on-site.

SUMMARY OF THE INVENTION

Lubrication of wind-turbines or other mechanical systems often requires usage of portable lubrication devices. For example a user or operator may perform lubrication of mechanical parts of a wind-turbine on site and for this a portable lubrication device, that can be carried on the wind-turbine by the user, is required.

In some cases, wind-turbines and other systems may not have an electrical earth connection or protective earth (PE) connection in their electrical mains.

Current lubrication pumps are typically class-I appliances. In class-I appliances there is always a ground/earth connection in the mains cable or in the mains inlet of the appliance/device and this must be connected to the contactable surfaces, touch parts and components of the appliance if these are electrically conductive and can become live, e.g. in case of insulation failure. In other terms, the chassis or the cabinet of a class-I appliance/device must always be connected to earth or ground through a dedicated earth/ground wire or protective earth (PE). Typically, such earth/ground wire is provided to the mains connection of the class-I appliance, through the mains cable or the mains inlet, and is therefore connected to the mains ground/earth of the mains power supply of the target to be lubricated or to the earth of the working area.

In these class-I appliances, such as a class-I lubrication pumps or lubrication devices, the earth cable must be dimensioned so that a fuse or similar disconnects the electricity supply if a fault current, due to for example an insulation fault, causes dangerous voltage differences between the earth potential of the electricity supply and the device's contactable surfaces and components, such as metal touch parts of the device.

The protection only works if the person to be protected, the user, is at the same earth potential as the earth connection of the appliance. If this is not the case, the person may be exposed to dangerous voltage differences, which will result in dangerous contact currents. The same potential cannot always be secured, e.g. in wind turbines and other places where the individual building parts are not connected to a common earth connection.

Class-II devices have requirements on the electrical isolation between the electrical components. Class-II devices may be deprived of an earth/ground connection and may not have an earth/ground wire in their mains connection. A class-II device is, generally, a device designed in such a way that it does not necessarily require a safety connection to electrical earth.

In, for example, wind-turbines a common earth often does not exist or cannot be guaranteed and different parts of the building may have different earth potentials.

There is therefore a need for a class-II lubrication device.

A problem of existing lubrication devices is that they comprise a frequency converter or a high voltage frequency converter or a frequency inverter. The frequency converter is used to regulate the speed of a motor connected to a pump. The higher the frequency the higher the speed of the motor and therefore the higher the lubricant flow to a target to be lubricated. Regulation of the lubricant flow is therefore based, in existing lubrication devices, on usage of these frequency converters. Nevertheless, frequency converters available on the market are class-I appliances and, to be safely run, they require an earth connection, such as a PE (protective earth) connection in the mains power cord or power inlet of the lubrication device. For this reason existing lubrication devices cannot be used as class-II appliances, where earth connection may have to be absent, and a novel solution is therefore required to be able to design and produce class-II lubrication devices, that is lubrication devices, with insulation requirements, that may not be provided with an earth wire or protective earth wire (PE) in the mains cord and/or plug or mains inlet of the device, and still be safe to use for an user.

The inventors have realized that it is possible to implement a class-II lubrication device by substituting the frequency converter with a combination of a class-II power supply and a motor controller. This design choice may eliminate the requirement to use an earth connection because the class-II power supply will be designed with sufficient isolation and the operating voltages will not exceed 120 Volts DC or 50 Volts AC. For example, the power supply may be fully covered with plastic or other insulated material, and it may be double insulated. For this reason, touch parts of the power supply do not represent a hazard or danger to the user. Moreover, the output voltage of the power supply may be, in the present disclosure, an Extra-Low Voltage (ELV), being the Extra-Low Voltage (ELV) a voltage not exceeding 50 Volts AC or 120 Volts DC. In one embodiment of the present disclosure, the power supply Extra-Low Voltage output voltage is the input voltage of the motor controller, which, in turn, will feed an Extra-Low Voltage to the motor driving the pump. Therefore, both the motor controller and the motor controlled by the motor controller may operate at an Extra-Low Voltage (ELV). Consequently, any touch part or metal part of the device, such as a metal frame or a metal cabinet, will not have a voltage exceeding the output voltage of the power supply, that is an Extra-Low Voltage. In one embodiment of the present disclosure, the metal frame of the device, together with any other metal touch part of the device, may or may not be clumped to ground and the device may operate safely independently on whether a ground clump is provided and connected to a ground/earth of a working area where the user is located and operating the lubrication device. In one embodiment of the present disclosure, the lubrication device is therefore class-II, with or without ground connection but with no necessary ground connection, and can be operated safely on a wind-turbine or in other places not provided with a common ground or a common protective earth (PE) wire connection.

In one embodiment, the present disclosure relates to a portable class-II, in particular Extra-Low Voltage (ELV), lubrication device comprising:
  a. at least one class-II power supply;
  b. at least one electric motor controller powered by the at least one power supply;
  c. at least one electric motor controlled by the at least one motor controller;
  d. at least one pump activated by the at least one electric motor and connected to at least one lubricant container, the pump configured to pump a lubricant from the at least one container to at least one target to be lubricated,
  wherein an output voltage of the at least one power supply and an output voltage of the at least one motor controller and an operating voltage of the at least one motor is equal to or less than 50 Volts AC or 120 Volts DC.

In one embodiment of the present invention, the class-II power supply may comprise a cable with a plug for electrical connections to a mains circuit of a building or a wind-turbine. In this embodiment, the cable may be deprived of an earth/ground or protective earth (PE) wire but safety of the device may be provided by a class-II isolation of the power supply. In this embodiment the power supply may be completely insulated, preferably double-insulated, by an electrically insulating material, such as plastic.

In another embodiment of the present invention, the class-II power supply may comprise a power inlet for a cable plug, the cable inlet not comprising a protective earth wire. In this embodiment safety of the device may be provided by the class-II insulation of the power supply. In this embodiment the power supply may be completely insulated, preferably double-insulated, by an electrically insulating material, such as plastic.

In a further embodiment of the present invention, the class-II power supply may comprise a power inlet for a cable plug, the cable inlet, comprising a protective earth wire. In this embodiment safety of the device may be provided by the class-II insulation of the power supply and by the PE connection. In this embodiment the power supply may be completely insulated, preferably double-insulated, by an electrically insulating material, such as plastic.

Extra-low Voltage devices or appliances are devices where the voltage of any touch part, being for example a metal cabinet or a metal frame of the device, never exceeds 120 Volts DC or 50 Volts AC, and therefore the operating voltage of any of the electrical parts of the device never exceeds said limits.

In the present disclosure, class-II insulation and Extra-Low-Voltage (ELV) give the appliance a sufficient level of safety for the user, with or without a earth or protective earth connection in the device mains plug or mains inlet.

Speed control of the presently disclosed device may be achieved with different configurations. In one embodiment, the power supply is an AC/DC converter and the motor controller may comprise a relay. In this configuration the relay may switch the motor on and off and the motor speed may be controlled by adjusting power supply voltage. In another embodiment the motor controller may set duty cycle and/or frequency of motor voltage to regulate speed of the motor. In a further embodiment the power supply may be an AC/AC converter comprising a class II transformer and the relay may switch the motor on and off. In this configuration speed control may be achieved by having a motor controller that rectifies the power supply voltage and sets duty cycle and/or frequency of motor voltage.

The user may regulate the speed of pumping by inputting to the machine a desired flow value through a display or other control mechanism.

In one embodiment the lubrication device may comprise a wireless transmitter coupled to a mobile device, such as a tablet or a mobile phone, and regulation of the flow and/or the dose may be done on the mobile device and set to the lubrication device by wireless connection.

The output voltage provided at the output of the power supply may be an Extra-Low Voltage (ELV), with maximum value 50 Volts AC or 120 Volts DC, preferably 48 Volts DC, which removes the requirement of an earth connection for safe operation, even if the user may be exposed to some metal touch parts of the lubrication device, such as a metal frame or a metal cabinet.

The presently disclosed lubrication device may be portable, which makes it suitable to be used on, for example, wind-turbines.

In one embodiment, the presently disclosed lubrication device may be deprived of an earth/ground connection and may not have an earth/ground wire in its main connection, making it suitable to be used on wind-turbines or other systems where the individual parts are not connected to a common earth. It may be Extra-Low Voltage (ELV), that is its parts operate at voltages of maximum 50 Volts AC or 120 Volts DC, preferably maximum 25 Volts AC and 60 Volts DC, more preferably 48 Volts DC.

The disclosed lubrication device may not comprise a frequency converter, where frequency converters found on the market are class-I devices and require an earth connection or a protective earth connection (PE) to be operated safely.

In the presently disclosed lubrication device, the frequency converter is substituted by a class-II power supply and a motor controller, which may be provided without earth connection.

The presently disclosed lubrication device may respect insulation requirements of class-II appliances between all electrical parts of the device. All electrical parts of the presently disclosed lubrication device may be double insulated.

The presently disclosed lubrication device may have requirements on dimensions and weight such that the device is portable and may be conveniently carried on top of a, for example, wind-turbine.

In one embodiment, the presently disclosed lubrication device may be an Extra-Low Voltage (ELV) device with maximum operating voltage of all electrical parts of 50 Volts AC or 120 Volts DC, not provided with an earth connection or a protective earth connection (PE) in the mains plug or in the mains inlet.

In another embodiment, the presently disclosed lubrication device may be an Extra-Low Voltage (ELV) device with maximum operating voltage of all electrical parts of 50 Volts AC or 120 Volts DC, provided with an earth connection or a protective earth connection (PE) in the mains plug or in the mains inlet. In this embodiment the earth in the mains plug or in the mains inlet of the disclosed device is provided despite not being strictly necessary for safety, just as an extra precaution that the user may choose to utilize. In this embodiment, the device is still class II as all the insulation and double insulation requirements are satisfied, in particular, the power supply is double insulated.

Safety Extra-Low Voltage (SELV) devices are Extra-Low Voltage (ELV) devices with supplementary requirements on safety concerning, for example, insulation or protective separation between electrical parts, and without an earth connection or a protective earth connection (PE).

In one embodiment, the presently disclosed lubrication device may be a Safety Extra-Low Voltage (SELV) device, with operating voltage of all parts of maximum 50 Volts AC or 120 Volts DC, without a earth connection or protective earth connection (PE) in the mains plug or the mains inlet of the device but with an optional external earth clump on a metal frame of the device.

Protected Extra-Low Voltage (PELV) devices are Extra-Low Voltage (ELV) devices wherein the voltage cannot exceed ELV under normal conditions and under single fault conditions.

In one embodiment, the presently disclosed lubrication device may be a Protected Extra-Low Voltage (PELV) device with maximum operating voltage of all electrical parts of 25 Volts AC or 60 Volts DC, preferably 48 Volts DC, not provided with an earth connection or a protective earth connection (PE) in the mains plug or in the mains inlet, and optionally provided with an external earth connection or protective earth connection, implemented for example as a grounding clump on a metal cabinet of the device or a metal frame of the device or on any other metal parts of the device exposed to an user of the device. In this embodiment one of the low voltage output wires of the power supply may be grounded, that is connected to a metal frame or cabinet of the device.

BRIEF DESCRIPTION OF THE DRAWINGS

The invention will in the following be described in greater detail with reference to the accompanying drawings, which are exemplary and not limiting to the presently disclosed lubrication device.

DETAILED DESCRIPTION OF THE INVENTION

General

The present disclosure relates to a portable class-II, in particular Extra-Low Voltage (ELV), lubrication device comprising:
  a. at least one class-II power supply;
  b. at least one electric motor controller powered by the at least one power supply;
  c. at least one electric motor controlled by the at least one motor controller;
  d. at least one pump activated by the at least one electric motor and connected to at least one lubricant container, the pump configured to pump a lubricant from the at least one container to at least one target to be lubricated,
wherein an output voltage of the at least one power supply and an output voltage of the at least one motor controller and an operating voltage of the at least one motor is equal to or less than 50 Volts AC or 120 Volts DC.

Figure 1:
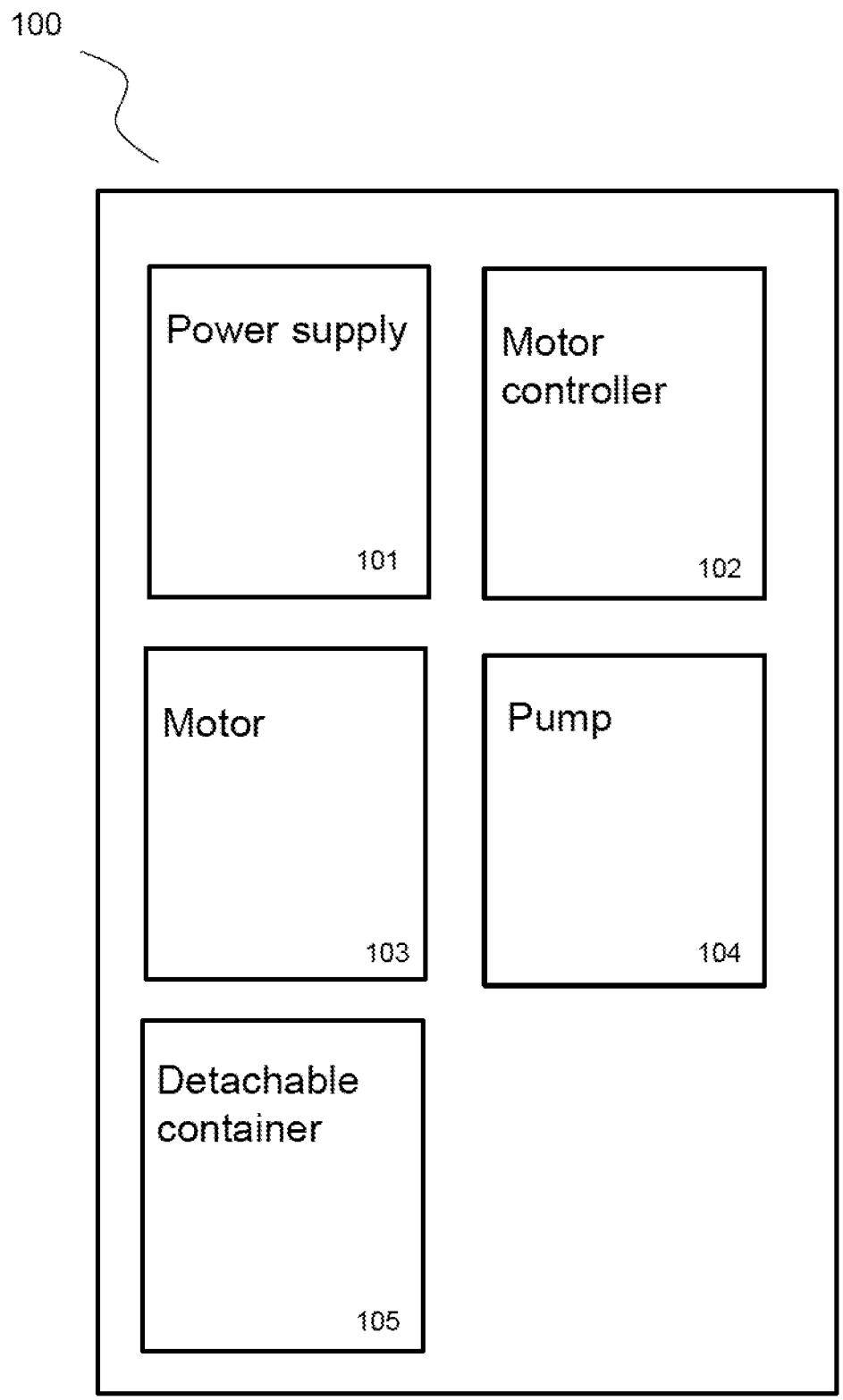
FIG. 1 a schematic view of the main components of an embodiment of the presently disclosed class II lubrication device.

FIG. 1 shows a schematic diagram of the main components of the presently disclosed class II lubrication device (100). The lubrication device comprises a power supply (101), a motor controller (102), an electric motor (103), a pump (104) and a detachable grease/oil container (105). The pump, which may comprise a piston pump or a gear pump, transfers the oil/grease from the detachable container to a target to be lubricated. The pump is activated by the electrical motor, which is controlled by the motor controller. The power supply supplies the needed power. All operating voltages of all electrical components respect the Extra-Low Voltage (ELV) standard, that is all voltages are equal or less than 50 Volts AC or 120 Volts DC, preferably 25 Volts AC or 60 Volts DC.

Figure 2:
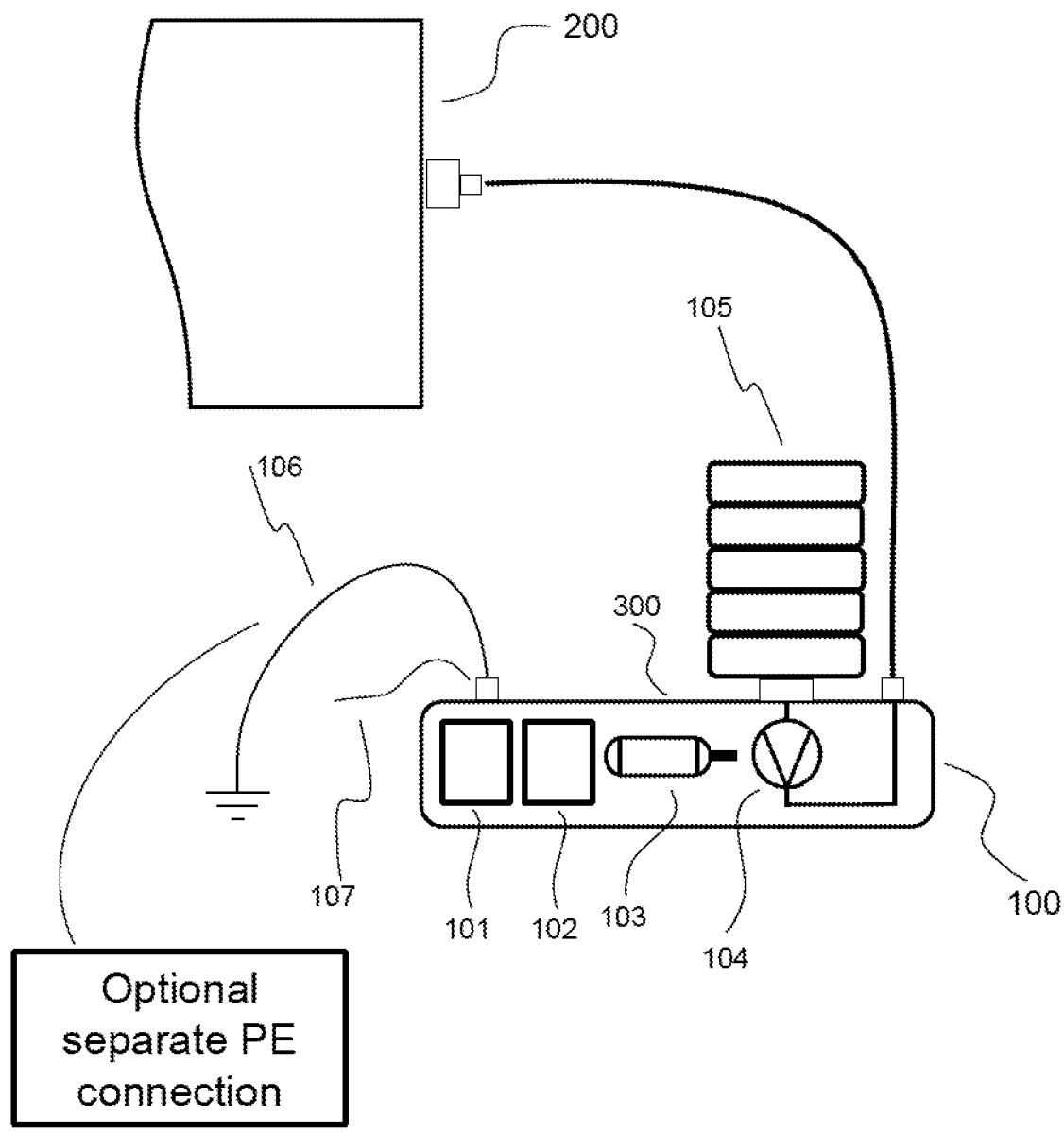
FIG. 2 a schematic view of one embodiment of the presently disclosed class II lubrication device.

FIG. 2 shows an embodiment of the presently disclosed class II lubrication device. The PE (protective earth) connection (106) shown in FIG. 2 is optional and may be external to the mains power cord or inlet (107). FIG. 2 also shows the class II power supply (101), the motor controller (102), the motor (103), the pump (104), the grease/oil container (105). The target to be lubricated (200) is also shown in FIG. 2, which is independent on the lubrication device. The frame or cabinet (300) of the device is also shown.

Figure 3:
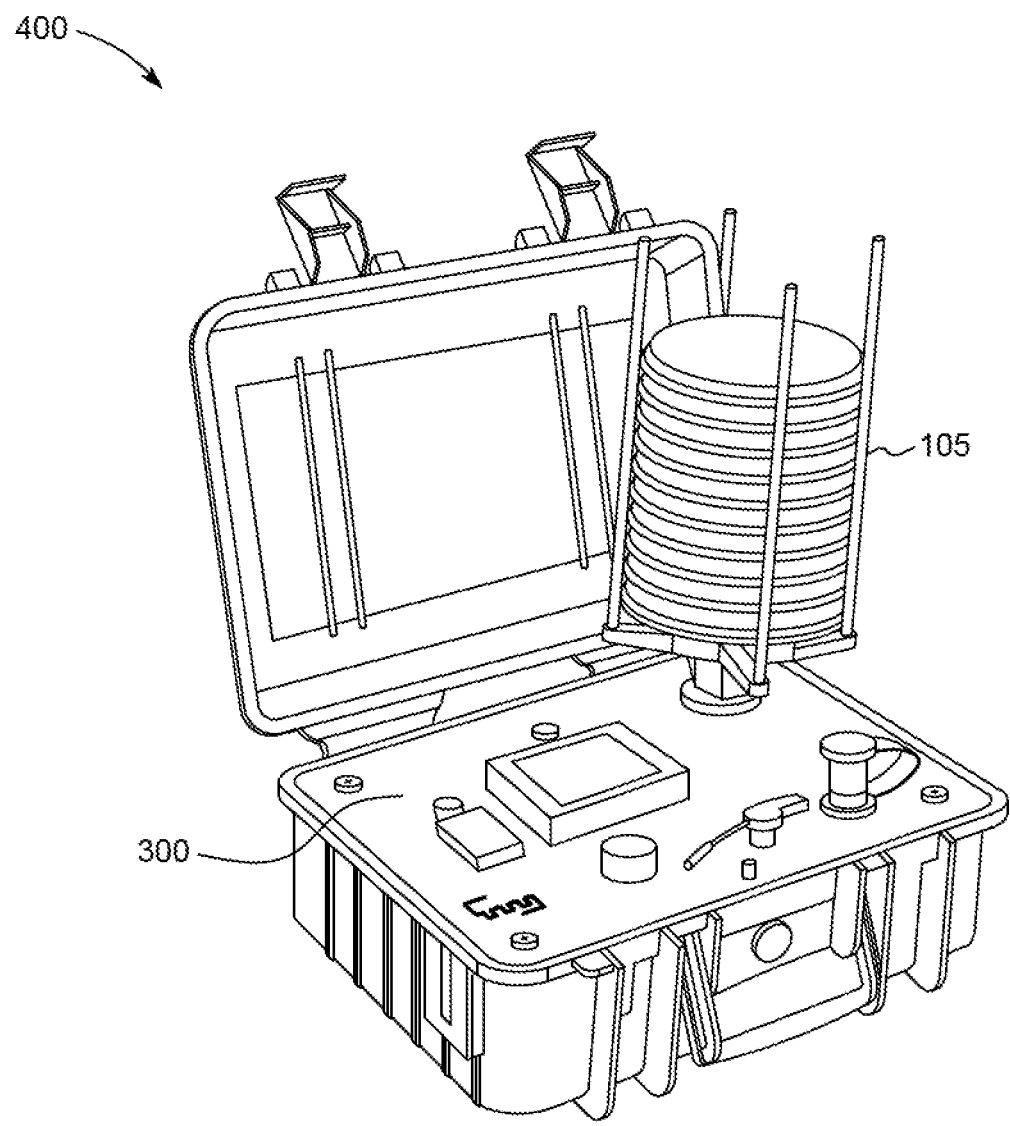
FIG. 3 an external view of an embodiment of the presently disclosed portable lubrication device.
Figure 4:
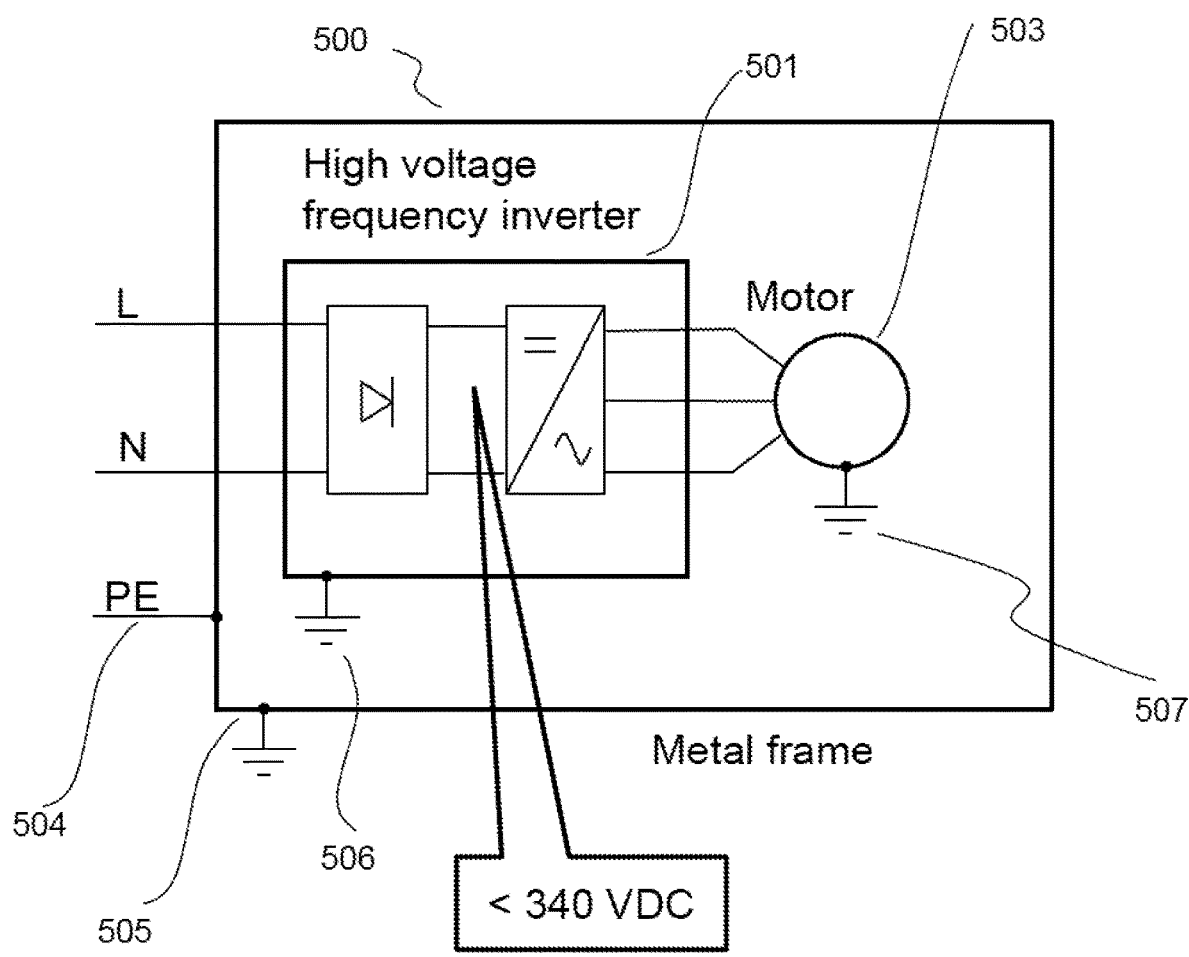
FIG. 4 an example of a prior art class I lubrication device with compulsory PE (protective earth) connection (504) in the mains cord or inlet. The prior art class I lubrication device comprises a high voltage frequency inverter (501) with an operating voltage up to 340 Volts DC, that must be grounded (506), that is electrically connected to the metal frame. In this configuration a fuse is going to interrupt power flow if a dangerous voltage potential is detected between the mains PE wire and the earth of the building.

FIG. 3 shows an embodiment of the presently disclosed lubrication device (400) with a cabinet or external frame (300) and a grease/oil container (105).

Figure 5:
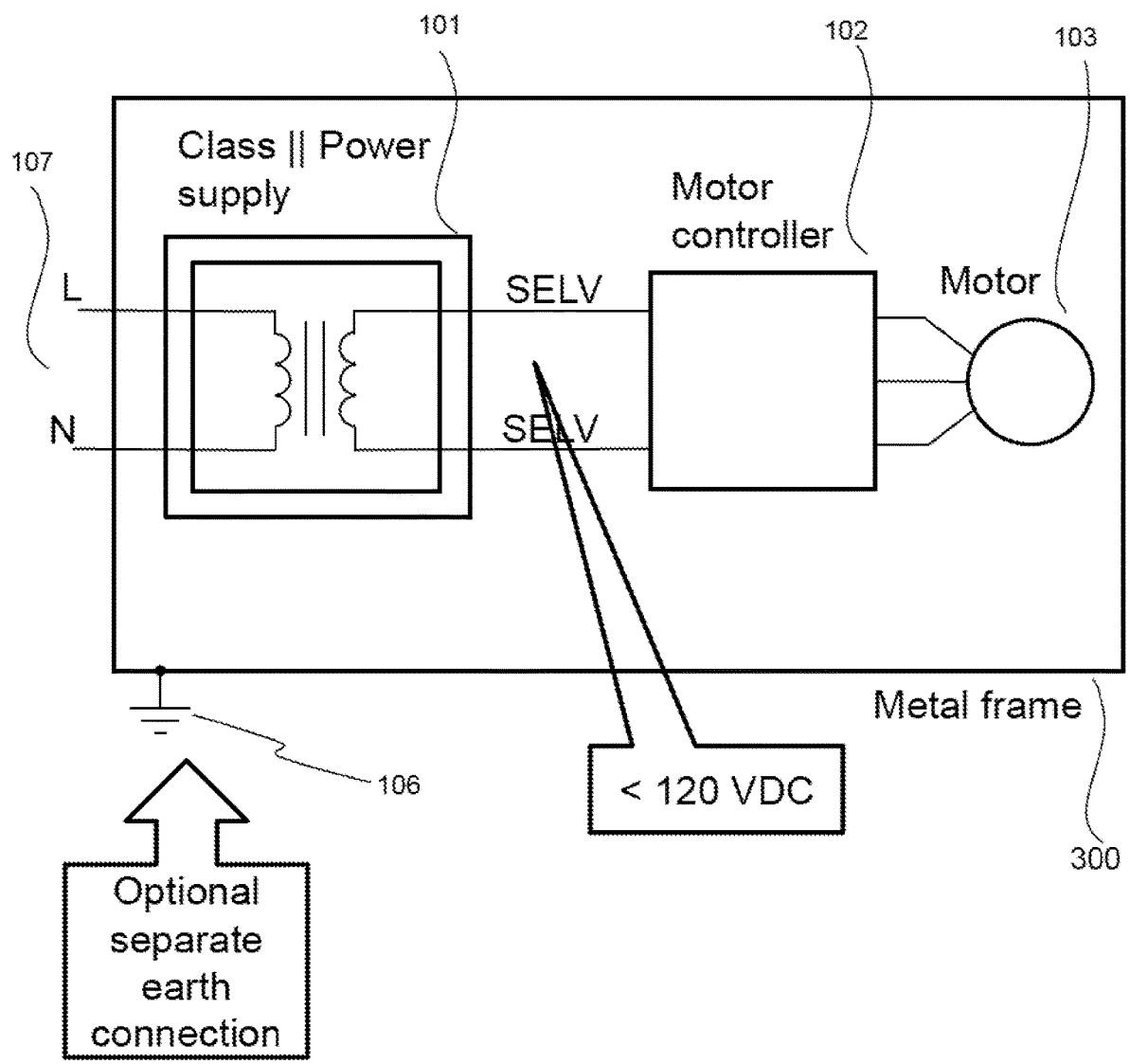
FIG. 5 a schematic diagram of one embodiment of the presently disclosed class II lubrication device with maximum operating voltage of 120 Volts DC or 50 Volts AC. The device may or may not have an optional external earth connection (106), the earth connection not present in the mains cord or inlet (107), wherein the cord or inlet only has two wires, such as active wire (L) and neutral (N) and no third PE wire. In this embodiment the external earth connection is electrically insulated from the Class II power supply input- and output connections. In this embodiment the device is SELV (Separated Extra-Low Voltage)

FIG. 5 shows an embodiment of the presently disclosed lubrication device. The lubrication device in this embodiment has a mains power cord or inlet (107) with only two wires, an active wire (L) and a neutral wire (N). In this embodiment the mains power cord or inlet does not comprise a PE (protective earth) connection. Nevertheless, in this embodiment the device may or may not have an optional separate earth connection (106) connected to the metal frame or cabinet (300) of the device. In this embodiment the output voltage of the power supply may not exceed 120 Volts DC or 50 Volts AC. In this embodiment the mains power cord or power inlet (107) of the device may not have a PE connection. In this embodiment the device is a class II device respecting all requirements on insulation. In this embodiment the device may be classified as a SELV device, that is a Safety Extra-Low Voltage device.

Figure 6:
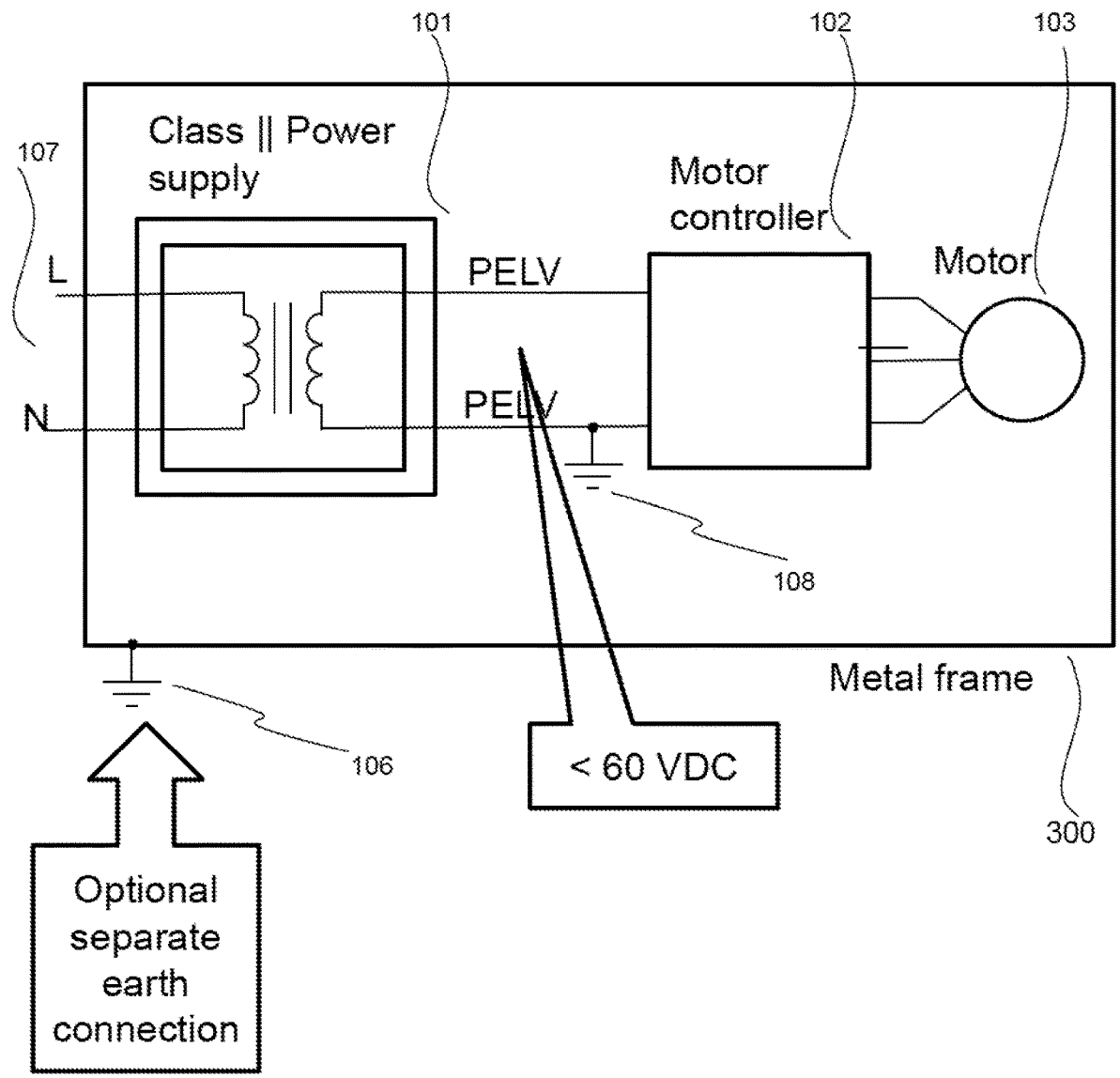
FIG. 6 a schematic diagram of one embodiment of the presently disclosed class II lubrication device with maximum operating voltage 60 Volts DC or 25 Volts AC with one output connection of the power supply (108) grounded, that is electrically connected to the metal frame or cabinet of the lubrication device. The device may or may not have an optional external earth connection (106) which may be external to the mains power cord or inlet (107). In this embodiment the device is PELV (Protected Extra-Low Voltage)

FIG. 6 shows an embodiment of the presently disclosed lubrication device. The lubrication device in this embodiment has a mains power cord or inlet (107) with only two wires, an active wire (L) and a neutral wire (N). In this embodiment the mains power cord or inlet (107) does not comprise a PE (protective earth) connection. Nevertheless, in this embodiment the device may or may not have an optional separate earth connection (106) connected to the metal frame or cabinet (300) of the device. In this embodiment the output voltage of the power supply may not exceed 60 Volts DC or 25 Volts AC. In this embodiment a low voltage output wire (108) of the power supply, may be connected to ground, that is to the cabinet or metal frame of the lubrication device or any exposed metal part of the device. The metal frame or cabinet of the lubrication device may have a separate connection (106) to earth of the working area via an external clump or wire. In this embodiment the device is a class II device respecting all requirements on insulation. In this embodiment the device may be classified as a PELV device, that is a Protected Extra-Low Voltage device.

Figure 7:
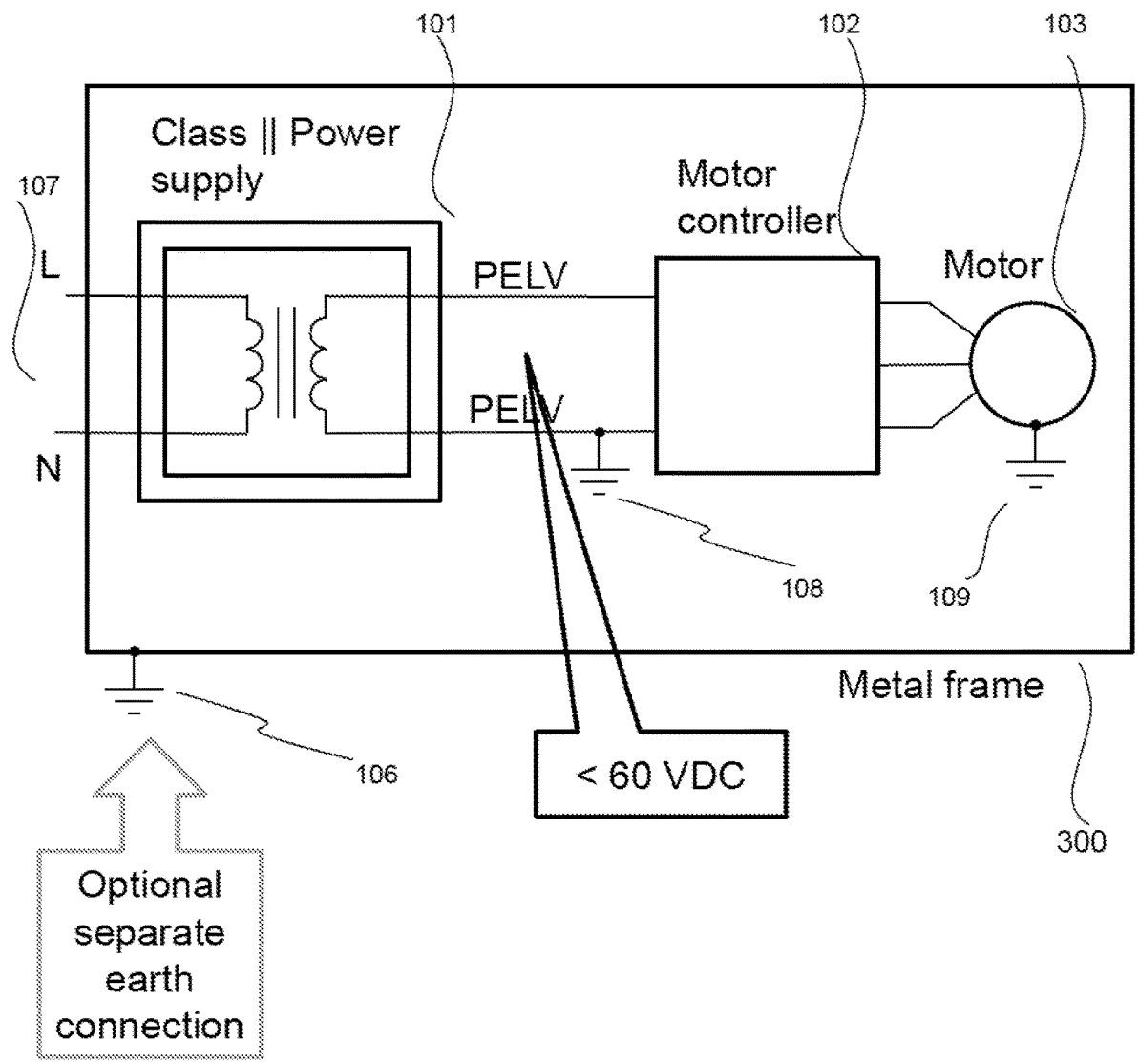
FIG. 7 a schematic diagram of one embodiment of the presently disclosed class II lubrication device with maximum operating voltage 60 Volts DC or 25 Volts AC with one output connection of the power supply (108) grounded and the motor also having a ground connection (109), that is one metal part of the motor is connected to the metal frame or cabinet of the lubrication device. The device may or may not have an optional external earth connection (106) which may be external to the mains power cord or inlet (107).

FIG. 7 shows an embodiment of the presently disclosed lubrication device. The lubrication device in this embodiment has a mains power cord or inlet (107) with only two wires, an active wire and a neutral wire. In this embodiment the mains power cord or inlet does not comprise a PE (protective earth) connection. Nevertheless, in this embodiment the device may or may not have an optional separate earth connection (106) connected to the metal frame or cabinet (300) of the device. In this embodiment the output voltage of the power supply may not exceed 60 Volts DC or 25 Volts AC. In this embodiment an output wire of the power supply (108) may be connected to ground, that is to the cabinet or metal frame of the lubrication device. The metal frame or cabinet of the lubrication device may have a separate connection (106) to earth of the working area via an external clump or wire. In this embodiment, the motor may have an earth connection (109), that is a connection to the metal frame or cabinet of the lubrication device. In this embodiment the lubrication device is a class II device respecting all requirements on insulation. In this embodiment the device may be classified as a PELV device, that is a Protected Extra-Low Voltage device.

In one embodiment of the present disclosure an electrical mains connection of the device is not provided with an earth wire, and the mains connection is single phase and provided with two wires, the two wires comprising an active and a neutral wire.

In another embodiment of the present disclosure the maximum output voltage of the power supply and the voltages of all other electrical parts do not exceed 60 Volts DC or 25 Volts AC and an electrical mains connection of the device is optionally provided with an earth wire, which may be a wire external to a mains power cord or inlet (127) of the device or may be within the power cord (127).

Frequency converters or high voltage frequency converters or frequency inverters found by the inventors on the market are class-I appliances and they require an earth connection.

The presently disclosed lubrication device is not comprising a frequency converter or a high voltage frequency converter or a frequency inverter or a high voltage frequency inverter. In the presently disclosed lubrication device, the present inventors have substituted the typically used frequency converter by a class-II power supply and a motor controller.

The motor controller of the presently disclosed lubrication device may be implemented in various ways, for example it may comprise a relay.

The disclosed lubrication device may be independent on the target to be lubricated, that is it could be separated from the target, portable and attachable to/detachable from the target.

The disclosed lubrication device may comprise a power cable and a plug or a power inlet connector for a cable with a plug. The power cable and plug or the power inlet may be insulated, preferably double insulated, with an insulated material such as plastic.

The lubricant used by the disclosed lubrication device may be oil or grease or a viscous lubricant or similar.

The disclosed lubrication device may comprise a container, such as a grease cartridge, the container being removable and/or detachable. The detachable container is very practical as an empty container may be easily substituted with a full container.

The power supply of the disclosed lubrication device may be removable and/or detachable. The power supply may not comprise or may comprise an earth connection and may be class II. The power supply may be double insulated, or the insulation may be reinforced. A reinforced insulation is an improved basic insulation with such mechanical and electrical properties that, in itself, the insulation provides the same degree of protection against electrical shock as double insulation. The reinforced insulation provides the same level of insulation like a double insulation.

The disclosed lubrication device may have physical specifications such to make it portable.

In one embodiment the weight of the device may not exceed 25 Kg, or preferably 15 Kg, or more preferably 10 Kg, or even more preferably 5 Kg, or most preferably 3 Kg.

In one embodiment a length of the disclosed device may not exceed 850 mm, or preferably 500 mm, or more preferably 420 mm, or even more preferably 350 mm, or most preferably 300 mm.

In one embodiment a width of the disclosed device may not exceed 650 mm, or preferably 400 mm, or more preferably 325 mm, or even more preferably 300 mm, or most preferably 250 mm.

In one embodiment a height of the disclosed device may not exceed 450 mm, or preferably 200 mm, or more preferably 180 mm, or even more preferably 150 mm, or most preferably 100 mm.

In one embodiment the physical dimensions of the disclosed device may not exceed 850×650×450 mm.

In a further embodiment the container of the disclosed device may contain a maximum of 15 l, or preferably 5 l, or more preferably 3 l, or even more preferably 2 l, or most preferably 1 l in volume, of the lubricant.

In one embodiment of the disclosed lubrication device an output flow may be between 10 ml/min and 4000 ml/min, or preferably between 10 ml/min and 2500 ml/min, or more preferably between 10 ml/min and 1800 ml/min, or most preferably 10 ml/min and 1400 ml/min.

In one embodiment of the disclosed lubrication device an operating pressure of the presently disclosed lubrication device may be between 5 BAR and 400 BAR, or preferably between 5 BAR and 300 BAR, or more preferably 5 BAR and 250 BAR. or most preferably 5 BAR and 150 BAR.

For convenience of the user it is advantageous to set a pre-determined amount of lubricant to be transferred from the lubricant container to the target. The disclosed lubrication device may comprise a built-in dosing counter configured to stop the motor and the pump when a pre-set amount of lubricant has been reached. The device may, in addition, comprise a touchable display or other control mechanism, connected to the motor controller, that may be used by the user to configure the dose.

The pump of the disclosed lubrication device may be a piston pump or a gear pump or another type of pump meeting the specification of light weight and that may be activated by a motor. Piston pumps are widely used for moving liquids and are based on a piston, a piston cup and a pump chamber. The piston oscillates in the piston cup and downwards oscillations cause pressure differentials filling the pump chamber, and upwards oscillations forces the fluid to be pumped out of the chamber. Gear pumps are also widely known and they typically comprise rotating wheels, wherein the movement of at least one of the rotating wheels is such that liquid is forced in one direction. In the present invention, a piston pump or a gear pump may be activated by an electrical motor.

In order to have a detachable power supply, the power supply of the disclosed lubrication device may be separated from the motor controller. In one embodiment of the present invention, the detachable power supply may be a battery.

In one embodiment of the presently disclosed lubrication device an input voltage of the power supply may be comprised between 100 Volts AC and 120 Volts AC.

In another embodiment of the presently disclosed lubrication device an input voltage of the power supply may be comprised between 200 Volts AC and 240 Volts AC.

In another embodiment of the presently disclosed lubrication device an input voltage of the power supply may be comprised between 90 Volts AC and 250 Volts AC.

The motor controller and the motor of the presently disclosed lubrication device may be a BLDC motor controller or a PMDC motor controller and/or a BLDC motor or a PMDC motor.

A PMDC motor, or Permanent Magnet DC motor, is a widely known type of DC motor that uses permanent magnets, in addition to optional first windings, generally placed in the inner part of a cylindrical stator, to generate a first magnetic field. As in most of DC motors, a rotor with second windings rotates inside the magnetic field, pushed by magnetic forces. The rotor is often equipped with commutator segments and brushes to continuously keep misalignment between the rotor magnetic field and the stator magnetic field. These motors have simple construction and can effectively be used in a lubrication device. They may operate on a 6 V, 12 V, 24 V or higher DC voltage, obtained from a battery or a rectifier or a controller. The driving force that is rotating the rotor generates from the interaction between the permanent magnetic field generated by the radially magnetized permanent magnets and the axial current on the rotor conductors. Speed of PMDC motors may be controlled by controlling the armature voltage, that is the voltage applied to the windings of the rotor, or by controlling the series resistance between the voltage source and the motor (rheostat control).

A BLDC motor is a brushless DC motor. It is an electronically commutated motor using a DC power supply. It uses an electronically commutated controller to switch DC currents in the rotor and produce magnetic fields which effectively rotate in space, producing a rotation of the motor. A BLDC motor controller adjusts phase and amplitude of DC current pulses to control speed and torque of the motor. BLDC motors find applications in many fields and, in this disclosure, are effectively used to drive pumps in lubrication devices. An advantage of BLDC motors is that they are not affected by brush consumption as they are brushless. Another advantage of BLDC motor is the lack of friction due to the lack of brushes and the lack of voltage drop on the brushes, brush drop. Therefore a BLDC motor often has a higher efficiency.

In another embodiment, the motor may be a PMAC motor and the motor controller a PMAC motor controller.

A PMAC motor is a Permanent Magnet AC Motor. A PMAC is an AC (Alternate Current) Motor with a permanent magnet typically attached to the rotor, preferably instead of or in addition to electromagnets in the rotor. Typically these motors have good efficiency.

In a further embodiment, the motor may be a step motor and the motor controller may be a step motor controller.

Step motors are also known as stepper motors or stepping motors. Step motors are brushless DC (Direct Current) electric motors, that divide a full rotation into a number of equal steps, where the motor position can be commanded to move and hold at one of the steps.

In a further embodiment, the motor may be an electric motor other than BLDC, PMAC, step or PMDC.

PELV

In one embodiment of the presently disclosed lubrication device, an output voltage of the at least one power supply and an output voltage of the at least one motor controller and an operating voltage of the at least one motor is equal to or less than 25 Volts AC or 60 Volts DC, preferably 48 Volts DC. In this embodiment the lubrication device is a Protected Extra-Low Voltage (PELV) device which may or may not be provided with an earth or protective earth (PE) connection in the device mains plug or inlet, and which may or may not be provided by an external ground clump connected to a metal cabinet or a metal frame or a metal touch part that an user may be in contact to. This ground clump may be fully optional and not fully required for safe functioning of the lubrication device, given the low operating voltage of the lubrication device and the isolation, but the ground clump may be conveniently connected to an earth of the working area of the target for extra safety, based on a choice of the user, for example the user may connect this extra ground to an earth part of a wind-turbine providing an earth connection in the working area of the user.

In this embodiment, the disclosed lubrication device may therefore comprise a grounding clump on a metal part of the device, such as a metal cabinet or a metal frame of the device, wherein such grounding clump may be connected to an electrical earth of a working area of the target, and wherein a neutral or minus wire of a power supply of the device is connected to the metal part of the device, such as the cabinet or the metal frame.

In this embodiment, any touch parts of the disclosed lubrication device, that is parts that are exposed to a user of the device, have a voltage of no more than, or equal to 60 Volts DC or 25 Volts AC.

In this embodiment, the disclosed lubrication device may comprise a safety relay configured to terminate electrical supply to the device if a difference between an electric current flowing through a supply line active wire and an electric current flowing through a neutral wire is more than a threshold, such as the threshold being equal or less than 30 mA, or equal or less than 5 mA.

In this embodiment, the disclosed lubrication device comprises at least one metal part, such as a cabinet, exposed to an user of the device.

In a separate configuration of this embodiment, the ground clump is not present and, instead, a PE wire is present in the mains power cord or inlet of the lubrication device.

SELV

In another embodiment, the presently disclosed lubrication device may be a Safety Extra-Low Voltage (SELV) device, with operating voltage of all parts of maximum 50 Volts AC or 120 Volts DC, without a earth connection or protective earth connection (PE) in the mains plug or the mains inlet of the device.

The invention claimed is:

1. A portable class-II lubrication device or system, comprising:
   at least one class-II power supply;
   at least one electric motor controller powered by the at least one class-II power supply;
   at least one electric motor controlled by the at least one motor controller and powered by the at least one class-II power supply;
   at least one pump activated by the at least one electric motor and connected to at least one lubricant container, the pump configured to pump a lubricant from the at least one container to at least one target to be lubricated,
   wherein an output voltage of the at least one class-II power supply and an output voltage of the at least one motor controller and an operating voltage of the at least one motor is equal to or less than 50 Volts AC or 120 Volts DC.

2. The portable class-II lubrication device or system according to claim 1, comprising a power cable and a plug, or a power inlet connector for a cable with a plug or a power inlet for a cable plug, wherein the power cable and plug or the power inlet connector or power inlet for a cable plug is insulated with an insulation material.

3. The portable class-II lubrication device or system according to claim 1, wherein an input voltage of the at least one class-II power supply is between 100 Volts AC and 120 Volts AC, or between 200 Volts AC and 240 Volts AC, or between 90 Volts AC and 250 Volts AC.

4. The portable class-II lubrication device or system according to claim 3, wherein the power cable and plug, or the power inlet connector or power inlet for a cable plug, is connected to the at least one class-II power supply, which is further connected to the at least one electric motor controller, wherein the input voltage supplies the at least one class-II power supply, which supplies the at least one electric motor controller during operation of the class-II lubrication device.

5. The portable class-II lubrication device or system according to claim 1, wherein the lubrication device or system is configured to be supplied by a mains supply to the at least one class-II power supply during operation.

6. The portable class-II lubrication device or system according to claim 1, wherein an electrical mains connection of the lubrication device or system is not provided with an earth wire, and wherein the mains connection is single phase and provided with two wires, the two wires comprising an active and a neutral wire.

7. The portable class-II lubrication device or system according to claim 1, wherein the motor controller comprises a relay.

8. The portable class-II lubrication device or system according to claim 1, wherein the container, such as a grease cartridge, is removable and/or detachable.

9. The portable class-II lubrication device or system according to claim 1, wherein the at least one class-II power supply is removable and/or detachable.

10. The portable class-II lubrication device or system according to claim 1, wherein the at least one class-II power supply is integrated into the lubrication device or a separate class-II power supply being part of the lubrication system.

11. The portable class-II lubrication device or system according to claim 1, wherein the motor controller and the at least one class-II power supply are separated.

12. The portable class-II lubrication device or system according to claim 1, wherein the motor controller is a BLDC motor controller or a PMDC motor controller and/or wherein the motor is a BLDC motor or a PMDC motor.

13. The portable class-II lubrication device or system according to claim 1, wherein the motor controller is a PMAC motor controller and/or wherein the motor is a PMAC motor.

14. The portable class-II lubrication device or system according to claim 1, wherein the motor controller is a step motor controller and/or wherein the motor is a step motor.

15. The portable class-II lubrication device or system according to claim 1, wherein an output voltage of the at least one class-II power supply and an output voltage of the at least one motor controller and an operating voltage of the at least one motor is equal to or less than 25 Volts AC or is equal to or less than 60 Volts DC, or the operating voltage of the at least one motor is 48 Volts DC.

16. The portable class-II lubrication device or system according to claim 15, comprising a grounding clump on a metal part of the lubrication device or system, such as a metal cabinet or metal frame, wherein such grounding clump may be connected to an electrical earth of a working area of the target, and wherein one of a low voltage output wires of the class-II power supply of the lubrication device or system is connected to the metal part.

17. The portable class-II lubrication device or system according to claim 15, wherein touch parts of the device, that is parts that are exposed to a user of the device, have a voltage of no more than, or equal to 60 Volts DC or 25 Volts AC.

18. The portable class-II lubrication device or system according to claim 15, comprising a safety relay configured to terminate electrical supply to the lubrication device or system if a difference between an electric current flowing through a supply line active wire and an electric current flowing through a neutral wire is more than a threshold.

19. The portable class-II lubrication device or system according to claim 1, comprising at least one metal part, such as a cabinet, exposed to an user of the lubrication device or system.

20. The portable class-II lubrication device or system according to claim 1, wherein the device is a Protected Extra-Low Voltage (PEL V) device or wherein the lubrication device or system is Safety Extra-Low Voltage (SELV) and comprises an external ground clump connected to a metal frame or a cabinet of the lubrication device or system.

* * * * *